United States Patent
Streiff et al.

(10) Patent No.: US 10,537,876 B2
(45) Date of Patent: Jan. 21, 2020

(54) USE OF A CATALYST COMPOSITION FOR THE CATALYTIC DEPOLYMERIZATION OF PLASTICS WASTE

(71) Applicant: SOLVAY SA, Brussels (BE)

(72) Inventors: Stéphane Streiff, Shanghai (CN); Marco Piccinini, Brussels (BE); Armin T. Liebens, Shanghai (CN); Avelino Corma, Valencia (ES); Miriam Cerro-Alarcón, Valencia (ES); Jesús Mengual, Carcaixent (ES)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 16/062,696

(22) PCT Filed: Dec. 15, 2016

(86) PCT No.: PCT/EP2016/081297
§ 371 (c)(1),
(2) Date: Jun. 15, 2018

(87) PCT Pub. No.: WO2017/103012
PCT Pub. Date: Jun. 22, 2017

(65) Prior Publication Data
US 2018/0361356 A1 Dec. 20, 2018

(30) Foreign Application Priority Data
Dec. 18, 2015 (EP) ..................................... 15201134

(51) Int. Cl.
| | | |
|---|---|---|
| *C10G 1/00* | (2006.01) | |
| *C08J 11/16* | (2006.01) | |
| *B01J 21/04* | (2006.01) | |
| *B01J 21/12* | (2006.01) | |
| *B01J 29/06* | (2006.01) | |
| *C10G 1/10* | (2006.01) | |
| *B01J 23/62* | (2006.01) | |
| *B01J 21/06* | (2006.01) | |
| *B01J 21/10* | (2006.01) | |
| *B01J 21/16* | (2006.01) | |
| *B01J 23/02* | (2006.01) | |
| *B01J 27/14* | (2006.01) | |

(52) U.S. Cl.
CPC ............. *B01J 21/04* (2013.01); *B01J 21/063* (2013.01); *B01J 21/066* (2013.01); *B01J 21/10* (2013.01); *B01J 21/12* (2013.01); *B01J 21/16* (2013.01); *B01J 23/02* (2013.01); *B01J 23/624* (2013.01); *B01J 27/14* (2013.01); *B01J 29/06* (2013.01); *C08J 11/16* (2013.01); *C10G 1/10* (2013.01); *C08J 2323/02* (2013.01); *C08J 2325/06* (2013.01); *Y02W 30/705* (2015.05)

(58) Field of Classification Search
None
See application file for complete search history.

(56) References Cited

U.S. PATENT DOCUMENTS

| | | | |
|---|---|---|---|
| 4,851,601 A * | 7/1989 | Fukuda | C10G 1/002 585/241 |
| 5,045,519 A | 9/1991 | Meyer et al. | |
| 5,079,385 A * | 1/1992 | Wu | C07C 4/00 585/241 |
| 5,700,751 A | 12/1997 | Yang | |
| 2002/0156332 A1 | 10/2002 | Jiang | |
| 2012/0215043 A1* | 8/2012 | Gaffney | B01J 29/064 585/241 |
| 2014/0228606 A1* | 8/2014 | Narayanaswamy | C10G 1/10 585/241 |

FOREIGN PATENT DOCUMENTS

| | | | | |
|---|---|---|---|---|
| CA | 2918871 A1 | 1/2015 | | |
| CN | 102744101 A | 10/2012 | | |
| CN | 102744101 B | * | 7/2014 | |
| EP | 863197 A1 | 9/1998 | | |
| EP | 1797952 A2 | 6/2007 | | |
| JP | 08253773 A | * | 10/1996 | |
| JP | H08253773 A | 10/1996 | | |
| WO | 9712011 A1 | 4/1997 | | |
| WO | WO-9712011 A1 * | 4/1997 | ............. B01J 29/06 | |
| WO | 0066656 A1 | 11/2000 | | |
| WO | 2005094990 A1 | 10/2005 | | |
| WO | 2017/103018 A1 | 6/2017 | | |

OTHER PUBLICATIONS

English Machine Translation Description CN102744101 obtained from espacenet, pp. 1-11 (Year: 2019).*
English Machine Translation Description JPH08253773 obtained from espacenet, pp. 1-15 (Year: 2019).*

* cited by examiner

*Primary Examiner* — Philip Y Louie

(57) ABSTRACT

Use of a catalytic composition parameters comprising oxides of aluminum or oxidic compounds comprising aluminum and silicon with a molar ratio of aluminum to silicon of more than 1 in a process for the catalytic depolymerization of plastics waste.

13 Claims, 1 Drawing Sheet

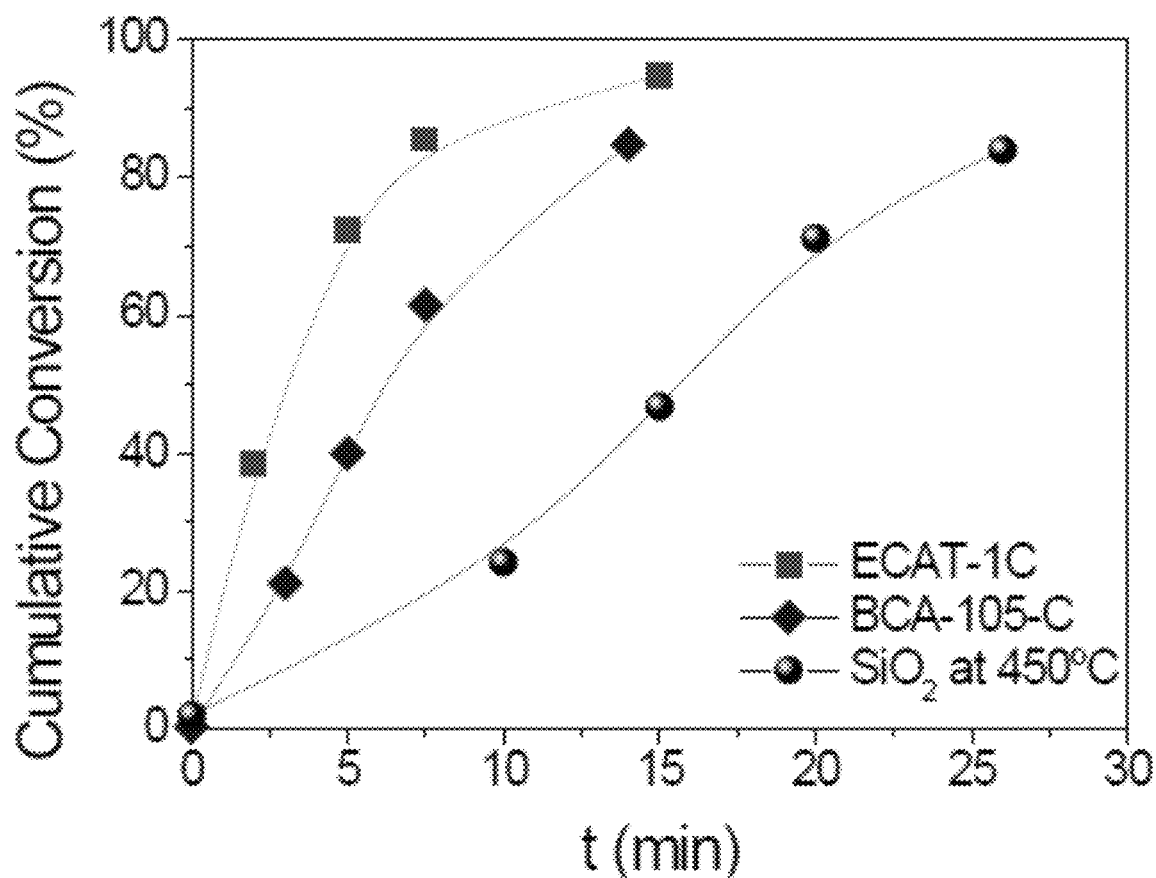

USE OF A CATALYST COMPOSITION FOR THE CATALYTIC DEPOLYMERIZATION OF PLASTICS WASTE

This application is a U.S. national stage entry under 35 U.S.C. § 371 of International Application No. PCT/EP2016/081297 filed Dec. 15, 2016, which claims priority to European application No. 15201134.2 filed on Dec. 18, 2015. The entire contents of these applications are explicitly incorporated herein by this reference.

The present invention relates the use of a catalyst composition for the catalytic depolymerization of plastics waste.

With the rapid development of the polymer industry in the last decades, plastics have become more and mole an indispensable part of our daily life and find use in a virtually unlimited number of different applications.

As a consequence thereof, significant amount of plastic waste is produced leading to problems once the plastics have come to the end of their useful life.

Most of the plastic materials do not or only very slowly degrade or decompose on the natural conditions which constitutes an environmental issue gaining increasing importance.

In view of this there have been research and development efforts targeting to the recycling or otherwise acceptable disposition of the plastics waste.

Recycling of plastics waste into other useful plastic products is mainly limited to thermoplastic materials and the recycled product is usually of poorer quality so that recycling is not an efficient way to handle all the plastics waste.

Incineration of the plastics waste may produce toxic gases due to ingredients and additives in the plastics or arising from the plastic material itself if same contains e.g. chlorine or other components which may lead to toxic or corrosive gases upon heating.

The so called tertiary or chemical recycling, in which the plastics materials are converted through catalytical or thermal cracking is expected to become more and more important, since these technologies permit the treatment of mixtures of different types of plastics, thereby avoiding the upstream separation of the different plastic materials.

Thermal or catalytic de-polymerization of plastic waste has therefore been investigated increasingly in the recent past.

WO 00/66656 relates to a process for obtaining hydrocarbons from plastic wastes by direct catalytic cracking which comprises heating the plastic wastes until melted plastics are obtained, contacting the melted plastic with a catalyst and removing the cracking products from the system. The catalyst is selected among the group comprised of fresh fluid catalytic cracking (FCC) catalysts, FCC equilibrium catalysts and mixtures thereof.

U.S. Pat. No. 5,700,751 is related to a catalyst used for treating waste plastics, which comprises a carrier and an active component. In accordance with claim 2, the carrier and the catalyst is silica.

EP 863,197 is directed to a process for producing gasoline, diesel and carbon black from waste rubber wherein the waste materials are charged into a pyrolysis device through a feeder (carbon black being discharged from the pyrolysis), charging the resulting materials in gaseous phase into a device for catalytic cracking and thereafter fractionating the resulting products through a column. A number of catalysts suitable for the process are described.

WO 2005/094990 relates to a process for preparing a cracking catalyst comprising mixing faujasite zeolite, pseudoboehmite alumina, polyammonium silicate, kaolin clay, milling said ingredients and making a slurry using water, spray drying said slurry to micro-spheres and thereafter calcining at 500° C. The catalyst is used for the cracking of plastics waste.

US 2002/156332 discloses a system for the conversion of waste plastics into hydrocarbon oil wherein in a first step the waste is subjected to thermal cracking and in a second step to a catalytic cracking with an acid catalyst.

Generally, in the catalytic depolymerization of plastic waste five classes of products are mainly obtained: gases, gasoline fractions, kerosene fractions, diesel fractions and waxes (hereinafter als referred to as Heavy Cycle Oil or HCO) and all of them can in principle be valorized. Gasoline/diesel and waxes are, however, the most commercially valuable products.

Particularly for gasoline fractions it is important to achieve a high octane number and for diesel fractions it is important to have a low concentration in polycyclic-aromatic hydrocarbons (hereinafter also referred to as polyaromatics) to meet the specifications for diesel fuel set by EN 590:2009+A1 (February 2010).

In particular it is difficult to obtain a product spectrum in a single catalytic reaction with a catalyst system wherein the different fractions meet all the requirements set forth above, i.e. high octane number for gasoline while at the same time keeping the content of poly-aromatics below the upper limit allowed by EN 590 (8%).

It was thus an object of the present invention to provide a catalyst composition suitable for use in the catalytic depolymerization of plastic waste which yields a product mixture comprising high amounts of gasoline and diesel with high quality.

This object has been achieved with the use of a catalyst composition as defined in claim 1.

Preferred embodiments of the present invention are set forth in the dependent claims and the subsequent detailed specification hereinafter.

In accordance with the present invention, a catalytic composition comprising oxides of aluminum or oxidic compounds comprising aluminum and silicon with a molar ratio of aluminum to silicon of more than 1, preferably of more than 1.5 to 1 and even more preferably of more than 1.7 to 1 is used in a process for the catalytic de-polymerization of plastics waste.

The catalyst composition used in accordance with a first embodiment of the present invention comprises oxides of aluminum. There are several oxides of aluminum known to the skilled person, the best known being Al(III)oxide ($Al_2O_3$) which is therefore preferred. But other oxides or oxidic compounds of aluminum which may contain other non-metals or metals besides aluminum may also be present.

In accordance with a preferred embodiment, the catalyst composition comprises oxidic compounds comprising aluminum and silicon besides oxygen. These compounds contain Al and Si in a molar ratio of more than 1:1, i.e. they contain more molar equivalents of Al than Si which distinguishes the compositions from classical zeolites which are used as FCC catalysts and which contain more equivalents of Si than Al.

The quantitative determination of silicon and aluminum can be achieved through X-ray fluorescence analysis. X-ray fluorescence (XRF) is the emission of characteristic "secondary" (or fluorescent) X-rays from a material that has been excited by bombarding with high-energy X-rays or gamma rays. This method is widely used for elemental analysis and chemical analysis, particularly in the investigation of metals and the skilled person is aware of respective methods and the equipment necessary.

When materials are exposed to short-wavelength X-rays or to gamma rays, ionization of their component atoms may take place. Ionization consists of the ejection of one or more electrons from the atom, and may occur if the atom is exposed to radiation with an energy greater than its ionization potential. X-rays and gamma rays can be energetic enough to expel tightly held electrons from the inner orbitals of the atom. The removal of an electron in this way makes the electronic structure of the atom unstable, and electrons in higher orbitals "fall" into the lower orbital to fill the hole left behind. In falling, energy is released in the form of a photon, the energy of which is equal to the energy difference of the two orbitals involved. Thus, the material emits radiation, which has energy characteristic of the atoms present. The term fluorescence is applied to phenomena in which the absorption of radiation of a specific energy results in the re-emission of radiation of a different energy.

Each element has electronic orbitals of characteristic energy. Following removal of an inner electron by an energetic photon provided by a primary radiation source, an electron from an outer shell drops into its place. There are a limited number of ways in which this can happen. The main transitions are given names: an L→K transition is traditionally called $K_\alpha$, an M→K transition is called $K_\beta$, an M→L transition is called $L_\alpha$, and so on. Each of these transitions yields a fluorescent photon with a characteristic energy equal to the difference in energy of the initial and final orbital. The wavelength of this fluorescent radiation can be calculated from Planck's Law:

$$\lambda = \frac{hc}{E}$$

The fluorescent radiation can be analysed either by sorting the energies of the photons (energy-dispersive analysis) or by separating the wavelengths of the radiation (wavelength-dispersive analysis). Once sorted, the intensity of each characteristic radiation is directly related to the amount of each element in the material.

The catalytic composition used in accordance with the present invention is in many cases predominantly amorphous in nature, which is a further difference to common fluid catalytic cracking catalysts mainly composed of zeolites which have a high degree of crystallinity. The perfectly ordered crystal lattice with every molecule in its expected lattice position is an ideal, but seldom achieved. The other extreme is the amorphous state in which a solid contains the maximum possible density of imperfections so that all long range order is lost while only the short range order, imposed by the nearest neighbors remains. Real crystals are between the both extremes and a crystals position on a scale bounded by the two extremes is termed crystallinity.

In reality a solid or a powder contains particles with different degrees of crystallinity. The lower the crystallinity of a solid the higher its enthalpy and entropy. The greater the amorphous character of a solid, the greater its apparent intrinsic solubility and dissolution rate but the lower its thermal stability.

Crystallinity or the content of amorphous parts of a powder can be measured e.g. by the so called internal standard X-ray diffraction method. According to this method, the material to be analyzed is grinded together with a reference material having a known degree of crystallinity and the relative intensity of certain peaks is compared with the intensity of the respective peaks in the standard. The sensitivity of such methods is usually 5-10%.

Predominantly amorphous in nature for the purpose of the present invention is intended to define a material in which at least 50 wt % has an amorphous nature and an overall degree of crystallinity of less than 30, preferably less than 20 and even more preferably less than 10% as determined by powder X-ray diffraction.

In accordance with a preferred embodiment the catalyst composition has a total acidity in the range of from 20 to 350, preferably of from 50 to 300 µmol/g of catalyst composition. The total acidity is determined in accordance with the following method by temperature programmed desorption or thermal desorption spectrometry using ammonia. Appr. 100 mg of sample, granulated in the 0.42-0.84 mm range are loaded as a fixed bed in a U-type Quartz reactor. The sample is pretreated at 450° C. for 1 h under Ar to eliminate any surface contamination and/or occluded volatile species that could be further desorbed during the measurement. Afterwards, a flow of ammonia is allowed by the means of a pulse system and using He as a carrier gas. Ammonia is chemisorbed over the solid sample at 100° C. until equilibrium is reached i.e. until the concentration of irreversibly chemisorbed ammonia at a fixed temperature is constant. Thereafter 100 ml/min of He are allowed inside the reactor and the temperature is progressively increased up to 900° C. at 10° C./min. Desorption of the ammonia is monitored by means of a thermal conductivity detector and mass spectrometer. Both adsorbed and desorbed volume are measured under pressure and temperature standard conditions.

In some cases it has proven advantageous if the catalyst composition has a certain minimum amount of Lewis acid sites, relative to the total acidity, in particular at least 20, preferably at least 25%. In some cases, it has been found that catalyst compositions comprising a maximum amount of 25, preferably 20 and even more preferably 15% of Bronsted acidity may be advantageous. Catalyst compositions substantially free of Bronsted acidic sites (i.e. comprising less than 5% of the total acidic sites of Bronsted acidic sites) and even more preferably being free of Bronsted acidic sites are particularly preferred.

The ratio of Bronsted acidic sites to Lewis acidic sites can be determined by Infrared spectroscopy as the two types of acid groups have a different IR absorption. The ratio of Bronsted to Lewis acidic sites can be determined by the temperature programmed desorption with pyridine e.g. as follows: Wafers of the composition to be analyzed with a thickness of 10 mg/cm$^2$ are degassed overnight under a vacuum of 0.01 Pa at 400° C. to eliminate water and organic compounds. Thereafter the wafer is exposed to pyridine vapor of 1866 Pa at room temperature. After equilibration, the sample is degassed for 1 h at increasing temperatures (150, 250 and 350° C.). FTIR spectra are recorded at room temperature before pyridine adsorption and after desorption at different temperatures. The spectrum gives characteristic peaks for pyridinium ions at Bronsted acid sites and at a lower wavelength for pyridinium ions at Lewis acid sites. Thus, the quantative evaluation of the IR spectrum can be used to determine the amount of each of Bronsted and Lewis acid sites.

In accordance with another preferred embodiment, the specific surface area of the catalyst composition, measured according to the so called BET method is in the range of from 70 to 300 and preferably of from 100 to 270 g/m$^2$.

The specific surface area is measured according to the so called BET method at a temperature of 25° C. using nitrogen as adsorptive gas. This method is described in ISO 9277. Brunauer, Emmett and Teller have published their pioneering work relating to this method in J. A.C.S.60(2), 1938, 309-319.

In accordance with another preferred embodiment of the present invention the catalyst composition has a pore size distribution such that at least 50%, preferably at least 60% and even more preferably at least 70%, most preferably at least 80% of the cumulative pore volume is formed by pores having a diameter of 5 nm or more. Concurrently, the catalytst used contains a very low amoiunt of micropores, i.e. pores with a diameter of 2 nm or less. Usually, the pore volume formed by pores with a diameter of 2 nm or less is less than 10, more preferably less than 5 and even more preferably less than 3% of the total pore volume. The porosity and pore size distribution of the material is determined by mercury porosimetry assuming a contact angle of 140° and a surface tension of mercury at 25° C. of 0.485 N/m in the scanning or continuous mode. Suitable equipment is available from Micromeritics and a suitable apparatus from Micromeritics is the Autopore series of instruments.

In general, determinations of parameters such as pore diameter, pore size distribution and surface area are well known techniques. In particular, such measurements can be done according to ISO standards. As mentioned above, ISO-9277 'Determination of the specific surface area of solids by gas adsorption—BET method" can be followed for determination of surface area. For the measurement of pore volume and pore distribution in mesoporous materials ISO15901-2 'Pore size distribution and porosity of solid materials by mercury porosimetry and gas adsorption—Part 2: Analysis of mesopores and macropores by gas adsorption' can be followed. For the measurement of pore volume and pore distribution in microporous materials ISO15901-3 'Pore size distribution and porosity of solid materials by mercury porosimetry and gas adsorption—Part 3: Analysis of micropores by gas adsorption' can be followed.

The catalyst compositions used in accordance with the present invention comprise more molar equivalents of Al than Si (if Si is present at all) which distinguishes same from so called FCC catalysts which find use in the cracking of natural oil and which have also been described in WO 00/66956 mentioned before for the catalytic depolymerization of plastics waste. FCC catalysts have a Si:Al ratio of significantly higher than 1. The catalytical compositions used in accordance with the present invention are known per se.

Respective materials have e.g. found use as so called bottoms-cracking additives in the fluid catalytic cracking carried out in a refinery.

Bottoms cracking additives have a medium surface acidity and large pore sizes which allow the cracking of larger molecules as the FCC catalysts themselves, for which the major part of the pores is significantly smaller than 5 nm.

A first group of preferred catalytic compositions is based on an aluminosilicate compound wherein an oxide of silicon component is chemically compounded with an oxide of aluminum component, preferably an acid dispersible alumina, a clay or a non-dispersible alumina.

In this embodiment, the aluminosilicate compound preferably contains from about 0.5 to 50 wt %, preferably of from 1 to 40 wt % of an oxidic compound of silicon expressed as silica ($SiO_2$)-equivalent.

The content of the oxidic compound of silicon is expressed in silica-equivalent and it is measured as follows: the content of elemental silicon (Si) is measured (example of suitable analytic method is ICP-OES: Inductively Coupled Plasma Optical Emission Spectrometry), the Si content is mathematically converted into $SiO_2$ concentration-equivalent: silica-equivalent content=Si content/atomic weight of Si*molecular weight of $SiO_2$ In accordance with this embodiment of the present invention the aluminosilicate compound comprises an oxidic compound of silicon component placed in a molecular structure of an oxidic compound of aluminum in order to create an aluminum/silicon oxide compound that exists in a chemically compounded aluminosilicate form in the final product.

Suitable, aluminosilicate compounds, wherein a silicon oxide component is a part of an aluminosilicate molecular structure, and certain preferred methods for their production, are described in U.S. Pat. No. 5,045,519.

This patent teaches processes for preparing high-purity, thermally stable, catalyst carriers by use of such aluminosilicate compounds. They can be obtained by mixing certain aluminum compounds with a silicic acid compound in an aqueous medium, and subsequently drying or calcining the resulting product.

Aluminosilicates obtained from such processes are often referred to as gel-type aluminas and are often characterized by the fact that they have surface characteristics that cause them to be acid dispersible, which is why they are also often referred to as acid-dispersible alumina. Such acid-dispersible alumina is the preferred type of alumina used for compounding with the silica to obtain the catalytic composition of this embodiment.

For the preparation of the catalytic compositions in accordance with this embodiment, chemically compounded aluminosilicate, e.g. as obtained in accordance with aforementioned U.S. Pat. No. 5,045,519, and an acid-dispersible alumina are mixed in a first step to form an aluminosilicate/acid-dispersible alumina slurry. Thereafter an acid is added to the slurry to cause the ingredients to undergo a gel type reaction and to form an aluminosilicate/acid-dispersible alumina/acid gel. Thereafter a clay ingredient can be added to the gel and thereby form a gel/clay mixture. Thereafter the alumina ingredients which is not acid-dispersible is added to the mixture.

The acid-dispersible alumina in the final catalytic composition is preferably present in an amount of from 15 to 30% by weight, the aluminosilicate is preferably present in an amount of from 5 to 30 weight percent, the non-dispersible alumina is preferably present in an amount of from 5 to 25% by weight and the clay is preferably present in an amount of from 30 to 60 weight percent. All percentages are given based on the weight of the entire composition.

The product resulting from the slurry formulations are thereafter dried and calcined in a manner known per se to the skilled person.

Further details on suitable catalytic compositions for use in accordance with the present invention as outlined above can be taken from WO 97/12011 to which reference is made herewith.

Products of the type described before as catalytic composition for use in the present invention are commercially available from a number of sources.

A second group of catalytic compositions suitable for use in the present invention are compositions comprising of from 50 to 100 wt %, preferably of from 50 to 99.5 wt %, and particularly preferably of from 50 to 95 wt % based on the weight of the composition, of at least one catalytically active amorphous metal oxide component selected from the group consisting of alumina and aluminosilicates and of from 0 to 50 wt %, preferably of from 0.5 to 50 wt %, and particularly preferably of from 5 to 50 wt %, based on the weight of the composition, of a crystalline catalytically active component containing at least one microporous aluminosilicate.

The amorphous catalytic component comprises preferably 10 to 90 wt % alumina and of from 0 to 30 wt % of silica.

Suitable catalytically active amorphous components are commercially available from Johnson Matthey under the tradename Intercat BCA, from Albemarle under the tradename BCMT and from BASF Catalysts under the tradename Converter.

If present, the microporous crystalline aluminosilicate, is preferably a zeolite. Preferred zeolites have a molar ratio Si/Al of at least 10.

Zeolites are microporous aluminosilicate minerals widely used in fluid catalytic cracking of natural oil in refineries.

A zeolite mineral is a crystalline substance with a structure characterized by a framework of linked tetrahedra, each consisting of four O atoms surrounding a cation. This framework contains open cavities in the form of channels and cages.

Zeolites are based on $TO_4$ tetrahedra where T is usually an aluminum or a silicon atom (or phosphorus in aluminophosphates). The three-dimensional networks of zeolites are the result of all four corners of the tetrahedra being shared, leading to low density microporous materials.

Zeolites may be generally characterized by the formula

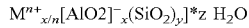

$$M^{n+}_{x/n}[AlO2]^-_x(SiO_2)_y]*z\ H_2O$$

wherein n denotes the charge of metal M and is usually 1 or 2, i.e. M is typically a cation of an alkaline or an alkaline earth metal or hydrogen. The cations serve the purpose of neutralizing the charge of the Al tetragons having a negative charge and are not incorporated in the main crystal lattice but are rather present in the cavities of the lattice. For this resons the metals M are usually mobile in the lattice and may be rather easily exchanged. Z is the indication of the number of water molecules which can be adsorbed. Zeolites are capable to reversibly adsorb and desorb water without deterioration of their crystal structure.

The molar ratio y/x in the above formula is often referred to as the modulus and is always greater than or equal to 1.

Preferred crystalline microporous zeolites useful for the catalytic compositions in accordance with the second embodiment of the present invention, are ZSM-5, ZSM-11, ZSM-22, ZSM-23, ZSM-35, ZSM-48, ZSM-50, TS-1, TS-2, SSZ-46, MCM-22, MCM-49, FU-9, PSH-3, ITQ-1, EU-1, NU-10, silicalite-1, silicalite-2, boralite C, boralite-D and mixtures thereof.

The catalytic compositions used in accordance with the present invention generally have a larger pore size, a lower Na-content and a lower acidity than FCC catalysts which have been described in the prior art for the catalytic depolymerization of plastics waste.

Furthermore, FCC catalysts are highly crystalline whereas the major component of the catalytic compositions used in accordance with the present invention is preferably amorphous.

Last but not least, the catalytic compositions in accordance with the present invention preferably contain Na in an amount of less than 1 wt %, which is significantly less than in FCC catalysts.

In accordance with another preferred embodiment, the catalyst composition used in accordance with the present invention comprises one or more additional metals selected from the group consisting of magnesium, calcium, zinc, boron, titanium, zirconium or comprises phosphorus.

The catalytic compositions may be used in combination with a FCC catalyst in accordance with the present invention if increased gasoline yields are a primary goal. However, to obtain a high quality diesel fraction it is neither necessary nor preferred to use a combination of the catalytic composition as described above in combination with a FCC catalyst.

Further details concerning catalytic compositions suitable for use in accordance with the present invention are given in EP 1,797,952 to which reference is made herewith.

The weight ratio of catalyst composition to plastic waste in accordance with the present invention is not subject to particular restrictions. In some applications it has been advantageous if the weight ratio of plastic materials to catalyst composition is in the range of from 100:1 to 1:1, preferably 10:1 to 1:1 but the skilled person will determine the best suitable ratio in accordance with his professional knowledge and based on the specific application case.

The plastics waste that may be subjected to the catalytic depolymerization in accordance with the present invention can be selected from a variety of sources like post consumer waste plastics, off-spec plastics, industrial scrap plastic or the like. More particular, the mixture of thermoplastics includes waste plastics or industrial scrap plastics, in particular substantially consists of waste plastics. By plastics material substantially consisting of one or more particular polymers, products comprising preferably more than 25% by weight of said particular polymer, more preferably more than 40%, in particular more than 50% by weight of said particular polymer is meant. The polymers are preferably the thermoplastics as defined below.

Substantially comprising or substantially consisting of as used herein means that the composition comprises at least 50%, preferably at least 80%, more preferably at least 85% of the respective component. Percentages given herein are % by weight, based on the total weight of the composition, respectively, if not indicated otherwise.

Preferably, the plastics waste starting material comprises one or more thermoplastic polymers and is essentially free of thermosetting polymers. Essentially free in this regard is intended to denote a content of thermosetting polymers of less than 15, preferably less than 10 and even more preferably less than 5 wt % of the composition.

The thermoplastics used in the process may include mechanically assembled mixed plastic, glued mixed plastic, multilayered film plastic, multilayered plastic objects, composite plastic, etc.

The content of impurities of the mixture of thermoplastics is usually between 0.1 and 5% by weight, in particular in between 1 and 3% by weight. The impurities include organic materials and inorganic materials different from polymers, such as stones, soil, inorganic salts, metal, glass and alike. Examples of organic material are paper, food residues, textiles, wood, etc.

In a preferred embodiment, the mixture of thermoplastics as used in the process of the invention is mostly constituted of polyolefins and styrene polymers, preferably polystyrene. Preferably, the fraction of polyolefin and styrene polymers, preferably polystyrene in the mixture of thermoplastics is at least 50% by weight, more preferably at least 75% by weight, and in particular substantially consists of polyolefin and styrene polymers, preferably polystyrene. Preferably, the mixture of thermoplastics comprises less than 99.5% by weight of polyolefin and polystyrene, more preferably less than 99% by weight. As polyolefines, polypropylene and polyethylene are preferred.

Optionally, the mixture of thermoplastics comprises minor amounts of less desirable plastics such as PVC, PVDC, PET, PU, ABS, nylon, or fluorinated polymers, such as Teflon. Preferably, the content of these less desirable plastics in the mixture of thermoplastics is 10% by weight or less. More preferably, the content of the less desirable plastics in the mixture of thermoplastics is lower than 5% by weight, in particular less than 2% by weight.

The plastics waste used as starting material may be subjected to a pre-treatment prior to being subjected to the catalytic depolymerization with the catalytic composition in accordance with the present invention.

Thus, the starting material may by subjected to a process comprising the steps of a) introducing the mixture of thermoplastics in the form of particles into a reactor under reduction of oxygen content of the atmosphere surrounding the particles, b) heating the mixture of thermoplastics in the presence of a solvent to obtain liquefaction of a substantial part of the thermoplastics, c) separating insoluble fractions at the surface of the mixture and/or the bottom of the reactor, and d) recovering liquefacted thermoplastics from the reactor, wherein the process steps a) to c) are preferably conducted in one reactor.

In step a) of such process the mixture of thermoplastic particles is introduced into a reactor in the form of particles. Thermoplastics in the form of particles are known and available, typically from conventional dry treatment including size reduction by grinding or shredding, gravity separation by cycloning or magnetic separation of plastics, such as waste plastics. The particles preferably have an average size in the range of 10-100 mm, more preferably in the range of 10-50 mm. Suitable apparatuses for preparing and obtaining thermoplastics in the form of particles as specified herein are known in the art.

In step b) of the pre-treatment process referred to above, the mixture of thermoplastics is heated in the presence of a suitable solvent to achieve liquefaction of substantial part of the thermoplastics. Substantial part means preferably at least 50% by weight, more preferably at least 80% by weight, in particular at least 90% by weight, e.g. at least 99% by weight, based on the total content of thermoplastics. Heating can be conducted by any means known in the art. For instance, heating can be conducted by direct or indirect contact with a heater transfer medium, by mechanical friction, by induction, by radiation, or electrical power. Preferably, heating is conducted by direct or indirect contact with a heat transfer medium, in particular by indirect contact. Examples of indirect contact with heat transfer medium, is in an agitated closed vessel, screw auger, etc. Suitable heat transfer media are hot inert gas, steam or heat transfer oils.

The mixture of thermoplastics is heated in step b) of the pre-treatment process in the presence of a suitable solvent. Preferably, the solvent is a compound or mixture of compounds which are substantially liquid during step b) e.g. before, during and/or after heating to the final temperature in step b). Before heating, e.g. at room temperature (20° C.) the solvent may be substantially liquid or substantially solid. Typical solvents are hydrocarbons, e.g. oil, biodiesel or hydrocarbon cuts and mixtures thereof, which are known and available. Hydrocarbon cut is preferred. Hydrocarbon cut is a mixture of hydrocarbons and is e.g. available from pyrolysis of plastics. Gasoline cut available from pyrolysis of plastics is particular preferred. In a preferred embodiment the solvent used in step b) is an aliphatic hydrocarbon, preferably having a boiling point of between 50° C. and 150° C. (at standard conditions, 1 atm). Most preferred, an aliphatic hydrocarbon, or a mixture thereof, having a boiling point between 50° C. and 150° C. is used, such as one or more $C_6$ to $C_8$ aliphatic hydrocarbons, in particular $C_6$ to $C_8$ alkanes.

In step c) of the pre-treatment process insoluble fractions are separated. Insoluble fractions both comprise gaseous impurities, which are present or are formed during heating step b), as well as insoluble solids or liquids. Insoluble fractions may be removed from the bottom of the reactor, preferably by continuous extraction, e.g. via a screw device. Insoluble fractions which are solid or liquid and are lighter than the liquefacted thermoplastics can be removed from the surface of the mixture, which removal preferably is conducted continuously.

With such a pre-treatment the valuable plastic is separated from a mixture of thermoplastics, which may comprise an amount of impurities, as a melt, possibly diluted by a suitable solvent, such as a hydrocarbon cuts, while separating insoluble fractions, such as gaseous impurities, water and solid impurities by decantation and flotation of insoluble material. By using such a pre-treatment process, a mixture of thermoplastics, such as a crude plastics or waste plastics, is rendered particularly useful for the cracking (thermal depolymerization) process.

A further embodiment of the present invention relates to a process for the catalytic depolymerization of plastic waste wherein a) in a first step plastics waste is introduced into a reactor and melted and thereafter the temperature is increased to a temperature in the range of from 350 to 600° C., b) thereafter a catalytic composition comprising oxides of aluminium or oxidic compounds comprising aluminium and silicon with a molar ratio of Al:Si of more than 1 is added to the molten plastics, c) the catalytic depolymerization is carried out at a temperature of from 350 to 600° C., and d) the product fractions are recovered.

This process can be carried out in batch operation or in a continuous manner where the molten plastic is continuously fed to a reactor comprising the catalyst composition or vice versa.

The skilled person is aware of suitable apparatus and equipment for carrying out the process in accordance with the present invention and will select the suitable system based on his professional experience, so that no extensive details need to be given here. However, without willing to be bound by theory, some examples of reactor technologies that can be effectively used to carry out the invention comprise the stirred reactor, the rotary kiln, the bubbling fluidized bed reactor and the circulating fluidized bed reactor riser or downer. The rotary kiln is a cylindrical vessel, inclined slightly to the horizontal, which is rotated slowly about its axis. The material to be processed is fed into the upper end of the cylinder. As the kiln rotates, material gradually moves down towards the lower end, and may undergo a certain amount of stirring and mixing. In a bubbling fluidized bed reactor a fluid (gas or liquid) is passed through the catalyst particles at high enough velocities to suspend the catalyst and cause it to behave as though it were a fluid. In a circulating fluidized bed, also called transport reactor, the catalyst and the fluid flow co-currently at high speed. Generally a cyclone system is used to separate the fluid, which can undergo downstream processing, from the solid, which is recirculated to the reactor. These reactors can be either upflow for risers, or downflow for downers.

Also, suitable methods for recovering the product fractions are known to the skilled person and need not to be described in greater detail here.

The process comprising the use of the specific catalytic composition described herein before offers a new approach to treat plastics waste. By means of the catalytic de-polymerization reaction, plastic wastes (such as polyethylene (PE), polypropylene (PP), polystyrene (PS)) may be converted into fuels and other valuable products. Compared to other plastic waste-to-fuel technologies known in the art (e.g. thermal de-polymerization/cracking), the use of the catalytic composition described above for plastic de-polymerization has several advantages: high RON (research octane number) gasoline fractions and diesel fraction that meet EN590 specifications are obtained, the degree of flexibility in raw material compositions, is very high and more flexibility in product distribution and higher conversion rates (hence higher productivities) are achieved.

In the catalytic plastic de-polymerization, 5 classes of products can be identified: Gases, Gasoline fractions, Kerosene fractions, Diesel fractions (also referred to herein as heavy cycle oil or HCO). All of them can be in principle valorized on the market, however, gasoline/diesel and HCO fractions are the most attractive. Particularly for Gasoline fractions it is fundamental to achieve high RON and MON (motor octane) number. On the other hand, for diesel fractions, it is important to have a low concentration in poly-aromatics to meet specification set by EN590. Both targets are reached with the present invention.

Should the disclosure of any patents, patent applications, and publications which are incorporated herein by reference conflict with the description of the present application to the extent that it may render a term unclear, the present description shall take precedence.

EXAMPLES

General Description of the Procedure 30 g of plastic (20% Polypropylene, 80% Polyethylene) were loaded inside the reactor and a defined amount of catalyst (approximately 20 g) was stored in a catalyst storage tank. The reactor was closed and heated from room temperature to 200° C. during 20 minutes, while simultaneously purging with a 150 mL/min nitrogen flow. When the internal temperature reached the melting point of the plastic, stirring was started and was slowly increased to 690 rpm. The temperature was held at 200° C. for 25-30 minutes. During this heating process, nitrogen coming out from the reactor was disposed of. Meanwhile, the catalyst storage tank containing the catalyst was purged with nitrogen several times.

After this first pretreatment step, temperature was increased to the reaction temperature of 425° C. at a heating rate of 10° C./min, and the collection of gases and nitrogen in the corresponding gas sampling bag was started. When the internal temperature reached the reaction temperature, the catalyst was introduced into the reactor, and the circulation of the gaseous products was commuted to another pair of glass traps and corresponding gas sampling bag. This was considered as the zero reaction time.

During selected time periods, liquid and gaseous products were collected in a pair of glass traps and their associated gas sampling bag, respectively. At the end of the experiment the reactor was cooled to room temperature. During this cooling step, liquids and gases were also collected.

The reaction products were classified into 3 groups: i) gases, ii) liquid hydrocarbons and iii) residue (waxy compounds, ashes and coke accumulated on the catalyst). Quantification of the gases was done by gas chromatography (GC) using nitrogen as the internal standard, while quantification of liquids and residue was done by weight. Glass traps (along with their corresponding caps) were weighed before and after the collection of liquids, while the reactor vessel was weighed before and after each run.

The simulated distillation (SIM-DIS) GC method was used to determine the different fractions in the liquid samples (according to the selected cuts), the detailed hydrocarbon analysis (DHA) gas chromatography method was used to determine the PIONAU components (P=paraffin, I=isoparaffin, O=Olefins, N=Naphthenes, A=Aromatics) in the gasoline fraction of the last withdrawn sample ($C_5$-$C_{11}$: Boiling point <216.1° C.; what includes $C_5$-$C_6$ in the gas sample and $C_5$-$C_{11}$ in the liquid samples), and two dimensional gas chromatography allowed the determination of saturates, mono-, di- and tri-aromatics in the diesel fraction of the last withdrawn liquid samples ($C_{12}$-$C_{21}$; 216.1<BP<359° C.).

Comparative Example 1

20 g of an an equilibrated FCC catalyst were obtained from the company "Hermes catalysts". Experiments were carried out using a plastic mixture comprising 80 wt % HDPE and 20 wt % PP as raw materials. Reaction temperature was set to 425° C. Catalyst to plastic weight ratio was equal to 20/30 by wt.

Example 2

Example 1 was repeated except a bottoms cracking additive BCA-105 purchased from Johnson Matthey was used. This product, according to the datasheet had an attrition resistance in accordance with ASTM 757 D of 1.3, a surface area of 130 m$^2$/g, an apparent bulk density of 0.80, and an aluminum oxide content of 68 wt %. The wt ratio Si/Al was 0.452. The average particle size was 90 μm, with 12 wt % of the particles having an average diameter of less than 40 μm and 2 wt % of the particles having a size of less than 20 μm. The total acidity was 160 μmol/g with no Bronsted acidic sites being detectable by temperature programmed desorption with pyridine as described above.

Comparative Example 3

Example 1 was repeated except that only SiO$_2$ was used as catalyst.

The results of the analysis of the cumulative selectivity is given in Table 1.

TABLE 1

Selectivity towards certain fractions in %, MON, RON and polyaromatic contents

| Fraction | Comp. Ex. 1 | Ex. 2 | Comp. Ex. 3 |
| --- | --- | --- | --- |
| Gas | 6.2 | 9.3 | 6.4 |
| Gasoline | 41.5 | 32.5 | 17.7 |
| Kerosene | 28.3 | 23.5 | 20.8 |
| Diesel | 16.1 | 20.7 | 31 |
| HCO | 8 | 14.1 | 24 |
| RON | 79.6 | 80.1 | 71.5 |
| MON | 77 | 75.5 | 68.4 |
| Polyaromatic (wt %) | 14 | 3.1 | 2.4 |

The data in Table 1 show that Comparative Example 3 (SiO$_2$) yields high amounts of diesel but only low amounts of gasoline. Comparative Example 1 yields a high amount of gas and only lower yield of diesel. Furthermore, the diesel fraction obtained with Comparative Example 1 contained diaromatics and polyaromatics in an amount exceeding the upper limit of EN 590 for diesel, i.e. the diesel fraction could not be directly used without further purification. The amount of polyaromatics in the diesel fraction exceeded the amount in Example 2 by more than a factor of ten. Also monoaromatics are approximately higher by a factor of six in Comparative Example 1 vs. Example 2. The diesel fraction obtained in Comparative Example 3 fulfilled the EN 590 specification, but, as can be seen in the FIGURE, the cumulative conversion as function of reaction time was entirely unsatisfactory.

Thus, it is apparent that a fluid catalytic cracking catalyst (FCC catalyst) has good conversion over time but does not yield a high quality diesel fraction. SiO$_2$ does not have a noticeable catalytic activity (the thermal depolymerization without any additive resulted in about the same conversion). In any case, with SiO$_2$ the conversion achieved over time is not feasible for an economical commercial operation.

Furthermore RON and MON for the gasoline fraction in Comparative Example 3 was appr. 10% lower than for Example 2.

These results show that only the catalytic composition as described in the present invention lead to good conversion, gasoline fraction with high octane number and diesel fraction with polyaromatics and diaromatics content below the limit set forth in EN 590.

The invention claimed is:

1. A process comprising catalytically de-polymerizing plastics waste in the presence of a catalytic composition comprising oxidic compounds comprising aluminum and silicon with a molar ratio of aluminum to silicon of more than 1, wherein the catalytic composition comprises from 50 to 100 wt %, based on the weight of the composition, of at least one catalytically active amorphous aluminum oxide component which is aluminosilicate and from 0 to 50 wt %, based on the weight of the composition, of a crystalline catalytically active component containing at least one microporous aluminosilicate.

2. The process of claim 1 wherein the catalytic composition comprises an aluminosilicate compound wherein a silicon oxide component is chemically compounded with an aluminum oxide component.

3. The process of claim 2 wherein the aluminium oxide component is an acid dispersible alumina, a clay or a non-dispersible alumina.

4. The process of claim 1 wherein the catalytic composition comprises an oxide of silicon in an amount of from 0.5 to 50 wt (expressed as SiO$_2$ equivalent), based on the weight of the composition.

5. The process of claim 1 wherein the catalyst composition comprises one or more additional metals selected from the group consisting of magnesium, calcium, zinc, boron, titanium, and zirconium; or comprises phosphorus.

6. The process of claim 1 wherein plastics waste is selected from post consumer waste plastics, off-spec plastics and industrial scrap plastic.

7. The process of claim 1 wherein the plastics waste comprises at least 50 wt % of polyolefins, styrene polymers or mixtures thereof.

8. The process of claim 1 wherein the plastics waste is essentially free of thermosetting polymers.

9. A process for the catalytic de-polymerization of plastic waste, the process comprising:
   a) introducing plastics waste into a reactor, melting the plastics waste, and thereafter increasing the temperature to a temperature in the range of from 350 to 600° C.,
   b) adding a catalytic composition comprising oxidic compounds comprising aluminium and silicon with a molar ratio of aluminium to silicon of more than 1 to the molten plastics, wherein the catalytic composition comprises from 50 to 100 wt %, based on the weight of the composition, of at least one catalytically active amorphous metal oxide component which is aluminosilicate and from 0 to 50 wt %, based on the weight of the composition, of a crystalline catalytically active component containing at least one microporous aluminosilicate,
   c) carrying out the catalytic depolymerization at a temperature of from 350 to 600° C., and
   d) recovering the product fractions produced.

10. The process of claim 9 wherein the catalytic composition comprises an aluminosilicate compound wherein a silicon oxide component is chemically compounded with an aluminium oxide component.

11. The process of claim 9 wherein the plastic waste comprises at least 50 wt % of polyolefins, styrene polymers or mixtures thereof.

12. The process of claim 9 wherein the plastics waste is selected from the group consisting of post consumer waste plastics, off-spec plastics and industrial scrap plastic.

13. The process of claim 10 wherein the aluminium oxide component is an acid dispersible alumina, a clay and or non-dispersible alumina.

* * * * *